April 9, 1929.  J. PAVLICEK  1,707,992
CORN LIFTER
Filed Feb. 23, 1926
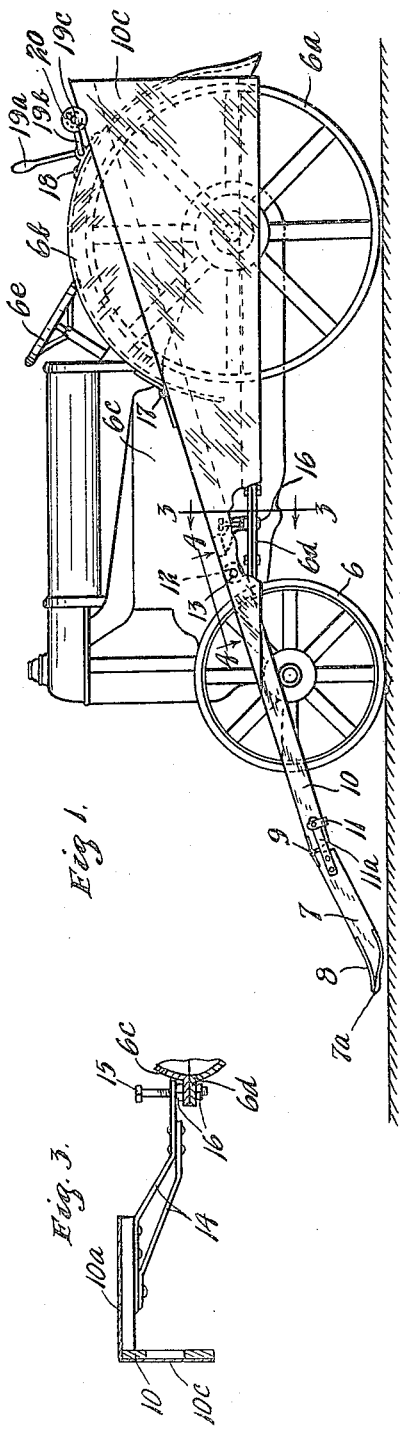
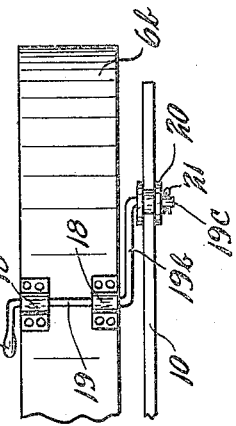
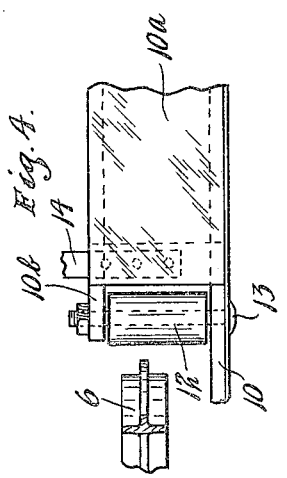
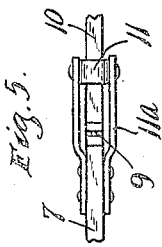
INVENTOR.
JOSEPH PAVLICEK
BY HIS ATTORNEYS.

Patented Apr. 9, 1929.

1,707,992

UNITED STATES PATENT OFFICE.

JOSEPH PAVLICEK, OF MONTEVIDEO, MINNESOTA.

CORN LIFTER.

Application filed February 23, 1926. Serial No. 89,878.

This invention relates to a device adapted to be used with a tractor when the tractor is operating in a corn or grain field. Tractors, such as the well known Fordson tractor, are now commonly used to draw corn pickers and other machines adapted to harvest the corn or other grain. When the corn is down, more or less, that is, the stalks have fallen over and the tractor draws the corn picker across the field longitudinally of the rows of corn a great many stalks which have fallen down are run over by the tractor wheels and are not harvested or operated upon by the picker so that a great deal of grain is lost.

It is an object of the invention to provide a lifter for the fallen stalks, which lifter is secured to the tractor and has a shoe or lifting member at one side of and in advance of the tractor which gradually lifts the fallen stalks and brings them into position to be effectively acted upon by the picker or other harvester.

It is a further object of the invention to provide a lifting device in combination with a tractor, which lifting device has a swinging arm or shoe at its forward end connected to an upwardly inclined guide member secured at longitudinally spaced points to the tractor.

It is another object of the invention to provide a device as set forth in the preceding paragraph, in which the guide is pivotally connected to the tractor, preferably to the rear wheel housing together with means for raising the guide and said shoe at its front end, which means is adapted to be readily operated by the driver of the tractor.

It is more specifically an object of the invention to provide a lifting device comprising an upwardly inclined shoe adapted to be disposed in front of and at one side of the tractor, which shoe is connected to an upwardly inclined guide suitably secured to the tractor having a top surface and a vertically disposed side surface, said guide having a roller adjacent the forward end of its top surface and in the rear of the front tractor wheel over which ears of corn are adapted to ride as they move upwardly on said guide.

These and other objects and advantages of the invention will be fully set forth in the following description made in connection with the accompanying drawings in which like reference characters refer to the same parts throughout the different views, and in which, Fig. 1 is a view in side elevation of the tractor of the well known Fordson type, having the invention applied thereto, certain parts being broken away;

Fig. 2 is a partial plan view of the rear portion of the tractor and device;

Fig. 3 is a vertical section taken on the line 3—3 of Fig. 1, as indicated by the arrows;

Fig. 4 is a horizontal section taken on the line 4—4 of Fig. 1 as indicated by the arrows; and Fig. 5 is a partial plan view of the front of the device showing a partial bottom plan view showing the connection of the lifter chute, Figs. 2 to 5 being shown on an enlarged scale.

Referring to the drawings, a tractor of the well known small type is illustrated, of which it will only be necessary to consider the front wheels 6, the rear wheels $6^a$, the rear wheel housing or fender $6^b$, the engine casing $6^c$, frame $6^d$ and the steering wheel $6^e$. In accordance with the present invention, a lifting device for grain stalks, such as corn stalks, is provided having a lifting shoe or arm 7 having a somewhat curved and substantially sharpened point $7^a$ at its lower end. While the arm 7 may be made of various materials, in the embodiment of the invention illustrated, it is shown as made of wood and having a pointed portion $7^a$ covered with a metal strip 8. The arm 7 inclines upwardly and rearwardly toward its rear end and is hingedly connected at said end by the hinge 9 to the lower end of an upwardly and rearwardly extending guide member 10. The arm 7 can thus swing upwardly and its position relatively to the guide 10 is normally determined by a yoke 11 embracing the lower side of the member 10 and carried on arm $11^a$ extending forwardly and secured at each side of the arm 7. The guide member 10 extends at one side of the front wheel 6 and, at some distance in the rear of said wheel, has an upper preferably flat portion $10^a$ secured and supported at its inner end by another bar $10^b$. A roller 12 is disposed adjacent the forward lower end of the portion $10^a$ having its top surface substantially flush with said portion, which roller is journaled on a headed and nutted bolt 13 extending between and through the members 10 and $10^b$. A bracket 14 is secured to the underside of members $10^a$ and $10^b$ and extends to the tractor frame $6^d$. One of the bolts which secures the engine casing or crank shaft casing 6ᶜ to the lower part of the casing or frame 6ᵈ is removed and a longer bolt 15 inserted in its place. This bolt 15 is provided with nuts 16 above and below the casing parts 6ᶜ and 6ᵈ so that said parts are tightly held together and the bolt above the upper nut 16 passes through a hole in the inner end of bracket 14. Bracket 14 is thus connected to the tractor but is capable of vertical movement between nut 16 and the head of bolt 15. The lifter also has a vertical side surface 10ᶜ of general triangular shape extending along the outer side of member 10, as shown in Fig. 1. While the lifter may be variously connected at its rear end, in the embodiment of the invention it is shown as pivotally connected to the axle housing 6ᵇ by the hinge 17. At the top of housing 6ᵇ, a short distance beyond the center thereof, brackets 18 are secured having journaled therein a crank shaft 19 having at its inner end the upwardly extending handle portion 19ᵃ and at its outer end the portion 19ᵇ, which latter portion has a horizontally extending portion 19ᶜ on which is journaled a grooved roller 20 held in place by a split key 21. The roller 20 is adapted to engage the upper rear end of portion 10ᵃ, said portion extending into the groove in said roller. It will be understood that in the invention, as illustrated, the portion 10 extends along the side of the wheel housing 6ᵇ. The wide horizontally disposed portion 10ᵃ terminates at the hinge 17.

In operation, the tractor will be hitched to a corn picker and will draw the picker along the rows of corn. As the tractor wheels move at one side of the outer row being operated upon by the picker, the wheels 6 will run closely adjacent said row, as will also the wheel 6ᵃ. The lifter arm or shoe 7 travels along in front of tractor quite close to the ground. Any stalks which have fallen over or have become bent over will be engaged by the arm 7 which will pass thereunder and said stalks will gradually be raised as the tractor advances and will slide up on the arms 7 and onto the guide 10. There is considerable room between the member 10 and the front wheel 6 and any ears of corn on the stalk can readily pass therebetween. However, as the stalks are raised higher, there is danger that the ears will be stripped therefrom as they approach the rear part of the tractor. For this reason, the roller 12 is provided. As the ears pass upwardly and rearwardly along member 10 they will engage the roller 12 which revolves very easily and will ride up over said roller and onto the top portion 10ᵃ of the lifter. The ears will thus be gently raised and kept on the stalks and will ride up on the member 10ᵃ and 10ᶜ until the stalk is raised sufficiently near erect position to support the ear and to be properly engaged by the picker which follows closely adjacent the member 10ᶜ. The ears swing to the outside of the vertical member 10ᶜ so that they pass very effectively to the picker or husker. When the tractor is to be turned, or it is not desired to use the picker, the operator reaches lever 19ᵃ which is disposed in convenient position to the tractor seat and pulls the lever rearwardly. This depresses the arms 19ᵇ and roller 20 and the front end of the guide is swung up about the hinge 17, the bracket 14 moving upwardly on the bolt 15. The arm 7 is thus considerably elevated and is out of the way of obstacles on the ground, while the tractor is being turned and maneuvered.

From the above description it is seen that applicant has provided a very simple and efficient attachment for picking up all the corn stalks which have fallen over or been blown over by the wind. The stalks and ears are very efficiently delivered to the corn picker. This device has been used by quite a number of farmers in harvesting corn and the same has saved from three to twelve baskets of corn in every load husked. This corn would ordinarily be lost. The lifter works very effectively either on smooth or rough ground. With the use of the device a tractor is much preferable for drawing the picker than horses as the horses always tramp more or less of the corn.

Another advantage of applicant's device is that when the same is used on the tractor a straight hitch may be used to the picker and the picker drawn directly back of the tractor. Heretofore it has been necessary to use a side hitch in an attempt to keep the tractor away from the corn. With the straight hitch all side draft is eliminated and a much better and easier operation of the tractor secured. The device is quite simple and can be inexpensively constructed and installed. The same effects a great saving and has great utility in use and constitutes a decided advance in the art.

It will, of course, be understood that various changes may be made in the form, details, arrangement and proportions of the parts without departing from the scope of applicant's invention, which, generally stated, consists in a device capable of carrying out the objects above set forth, in the novel parts and combinations of parts disclosed and defined in the appended claims.

What is claimed is:

1. The combination with a tractor for drawing a corn picker or harvester, of a lifting device comprising an upwardly and rearwardly inclined shoe having a lower and forward substantially pointed end disposed in front of and at one side of the tractor, an upwardly and rearwardly inclined guide member to which said shoe is pivotally mounted, said guide member extending along the outer side of the tractor wheel, means for pivotally connecting said guide to the tractor, and means for swinging said guide about said pivotal connection to raise the forward portion of said guide and said shoe.

2. The structure set forth in claim 1, said guide extending at one side of the front wheel of said tractor, a roller journaled on said guide to rotate about a horizontal axis, said guide having a portion extending upwardly and rearwardly from said roller and having a substantially vertical outer surface extending rearwardly from said front wheel.

3. The combination with a tractor for drawing a corn picker or harvester, of a lifting device comprising an upwardly extending lifting arm, an upwardly and rearwardly extending guide member to which said lifting arm is hingedly connected, said guide member extending along the outer side of said tractor wheel, means for limiting the swinging movement of said lifting arm and means for connecting said guide to said tractor for vertical movement relatively to said tractor.

4. The combination with a tractor for drawing a corn picker or harvester, of a lifting device comprising an upwardly and rearwardly inclined shoe, a guide member to which said shoe is connected for vertical swinging movement, said guide member extending along the outer side of the tractor and at the outer side of the wheels thereof, said guide member having a top surface for a portion of its length and being hingedly connected to the tractor intermediate its ends, said guide member also having a substantially vertical surface at its outer side, and means at the upper end of said guide for holding the same in different positions.

5. The combination with a tractor for drawing a corn picker or harvester, of a lifting device comprising an upwardly and rearwardly inclined shoe, a guide member to which said shoe is connected for vertically swinging movement, said guide member extending upwardly and rearwardly along the outer side of the tractor, and at the outer side of the tractor wheels, a roller journaled in said guide member having its top surface substantially flush with the top surface of said guide member and extending transversely thereof.

6. The structure set forth in claim 5, said guide member having a flat substantially horizontal surface extending upwardly and rearwardly from the top surface of said roller.

7. The combination with a tractor for drawing a corn picker or harvester and having a front wheel at one side thereof, of a lifting device comprising an upwardly and rearwardly inclined shoe, a guide member to which said shoe is connected at its rear end, said guide member extending upwardly and rearwardly at one side of said front wheel, a roller journaled in said guide member about a substantially horizontal axis, and extending transversely in the rear of said front wheel, said guide member having an upwardly and rearwardly extending flat top surface in the rear of said roller.

In testimony whereof I affix my signature.

JOSEPH PAVLICEK.